June 18, 1968 R. E. LOCHER ETAL 3,389,307
MATING CIRCUIT BREAKERS WITH SPACED BUS CLIPS
Filed Jan. 30, 1967 2 Sheets-Sheet 1

INVENTORS
ROSS E. LOCHER,
LELAND P. WILLIAMSON
BY THEIR ATTORNEYS
HARRIS, KIECH, RUSSELL & KERN

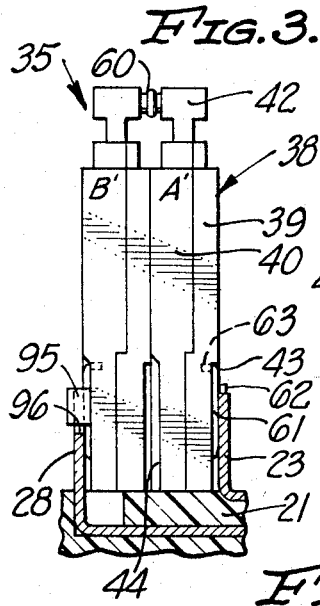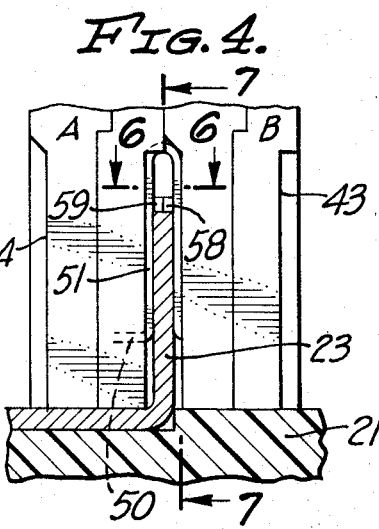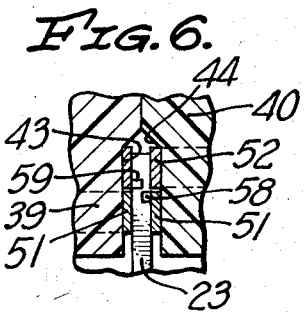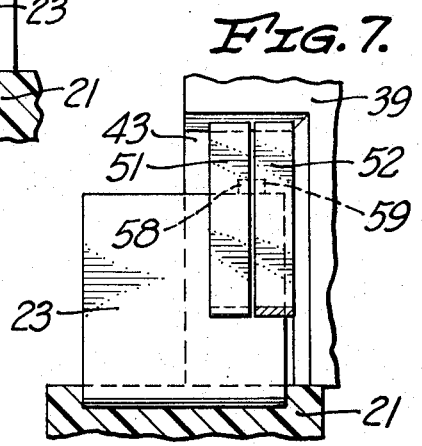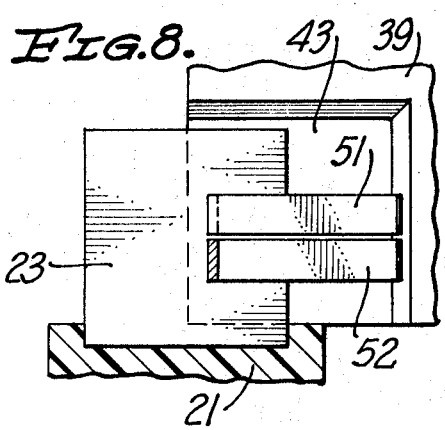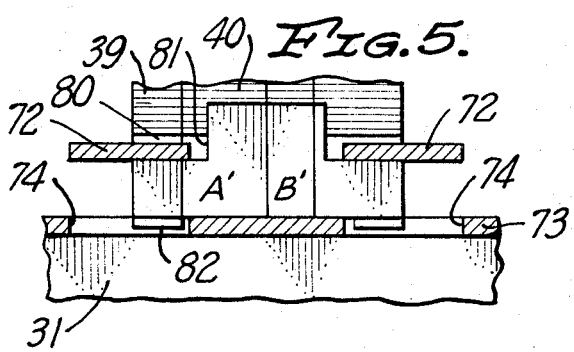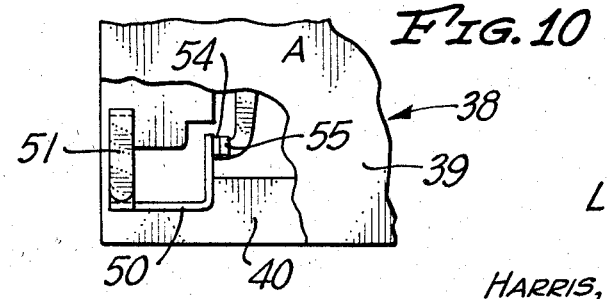
INVENTORS
ROSS E. LOCHER,
LELAND P. WILLIAMSON
BY THEIR ATTORNEYS
HARRIS, KIECH, RUSSELL & KERN

United States Patent Office 3,389,307
Patented June 18, 1968

3,389,307
MATING CIRCUIT BREAKERS WITH
SPACED BUS CLIPS
Ross E. Locher, West Covina, and Leland P. Williamson, Whittier, Calif., assignors to Zinsco Electrical Products, Los Angeles, Calif., a corporation of California
Filed Jan. 30, 1967, Ser. No. 612,607
4 Claims. (Cl. 317—119)

ABSTRACT OF THE DISCLOSURE

An electrical circuit breaker having a width one-half the spacing of bus blades of a panelboard, permitting two breakers to be installed in the space normally required for one. A housing and conductor design permitting installation of single breakers, dual breakers, and various combinations of single and dual breakers in a standard panelboard.

---

Figure 1:
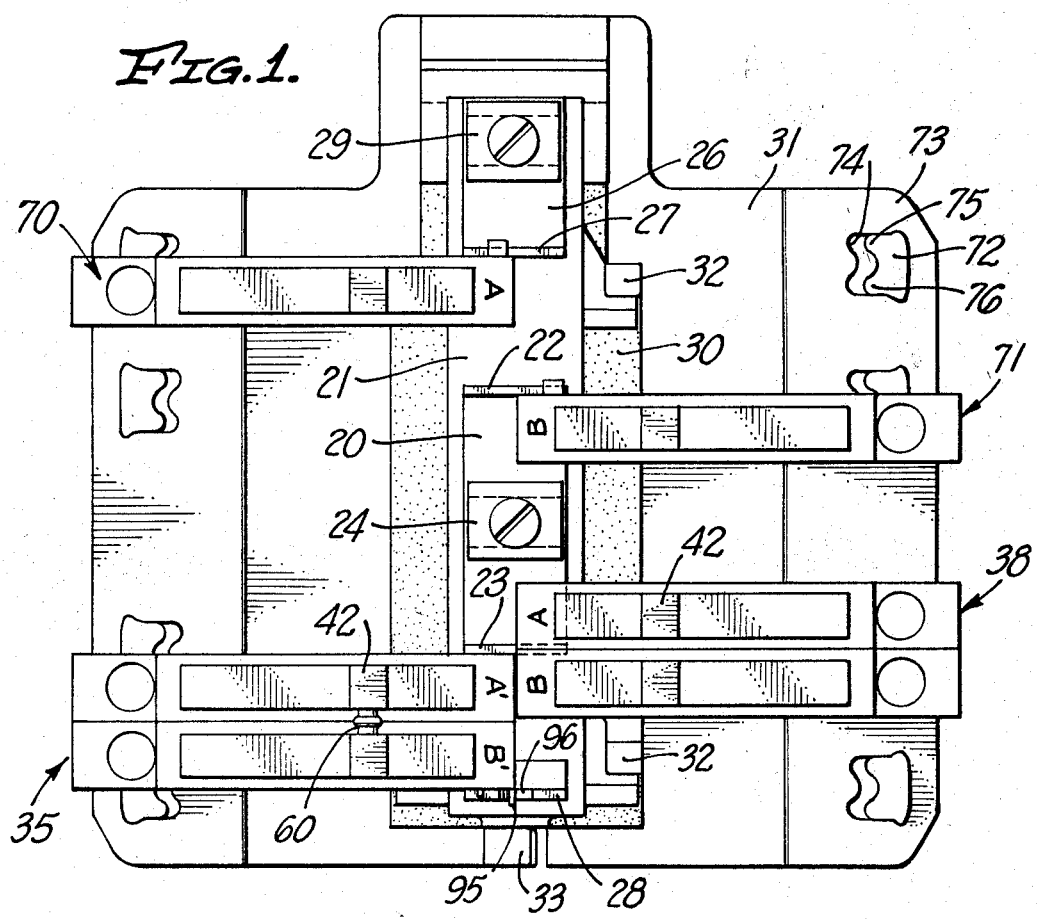

This invention relates to circuit breakers and arrangements for mounting breakers in panelboards and, in particular, to a new and improved half-size breaker adapted for mounting in a standard panelboard as a single breaker, as a same phase and as an opposite phase dual breaker, and in various combinations of singles and duals.

One standard form of load center or panelboard utilizes two line or power buses having contact blades which project upward in a parallel arrangement, with the blades electrically connected such that any two adjacent blades are connected to different polarity buses. In a typical arrangement, the bus blades are spaced one inch apart and the electrical circuit breakers mounted on the panelboard have one inch wide housings, providing for one breaker per bus blade. Sometimes two rows of one inch wide breakers are installed on a single row of bus blades. More recently, breakers have been manufactured in housings one-half inch wide and are often referred to as half-size breakers. The half-size breakers may be utilized with the standard panelboards and several breaker designs have been considered for accomplishing this end. Auxiliary contacts and adapters and additional panelboard engaging elements have been suggested. It is an object of the present invention to provide a new and improved circuit breaker construction for half-size breakers, permitting use of half-size breakers in full-size panelboards singly and in various combinations. An additional object is to provide such a breaker which is self contained and which does not require any adapters or auxiliary parts.

It is a particular object of the invention to provide a new and improved breaker construction permitting the use of a single half-size breaker in a panelboard, and the use of two single breakers side by side to form a same phase dual or to form an opposite phase dual. A further object is to provide such a breaker construction which permits joining of two half-size breakers to form a full-size same phase dual or an opposite phase dual, with such dual breakers being useable with similar dual breakers and with single breakers, permitting any desired combination of breakers in an installation.

It is an object of the invention to provide a circuit breaker for installation in a panelboard on one side of a bus blade with the breaker having a bus blade and conductor receiving zone at one corner of one side of the breaker housing, and a conductor mounted in the housing and having a bus engaging portion positioned in and occupying one portion of the zone, with the bus engaging portion of the conductor providing space at the zone for a second breaker having its bus blade engaging portion at the opposite side of its housing and in another portion of the zone, thereby permitting insulation of both breakers at a single bus blade. A further object is to provide such a breaker construction whereby two breakers may be positioned side by side with the bus engaging portions at the outer sides, permitting installation of both breakers between a pair of bus blades.

It is a particular object of the invention to provide such a circuit breaker incorporating a conductor mounted in the housing and having a bus clip positioned in the zone for slidingly gripping a bus blade. An additional object is to provide such a breaker incorporating a unitary piece of conducting metal with the external bus clip formed integral therewith and with the internal fixed contact carried thereon.

It is another object of the invention to provide such a circuit breaker including means for engaging the panelboard breaker retaining tabs for restraining a corner of the breaker remote from the bus engaging corner thereof.

The invention also comprises novel details of construction and novel combinations and arrangements of parts, which will more fully appear in the course of the following description. The drawings merely show and the description merely describes preferred embodiments of the present invention which are given by way of illustration or example.

Figure 2:
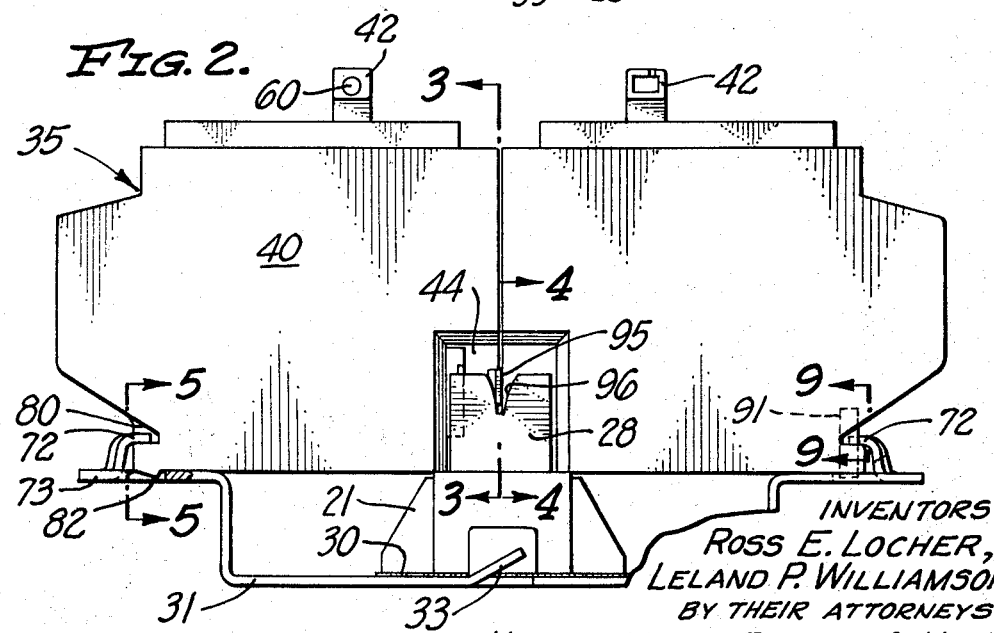

In the drawings:
FIG. 1 is a top view of a panelboard showing several breakers mounted thereon;
FIG. 2 is a side view of the assembly of FIG. 1;
FIG. 3 is a partial sectional view taken along the line 3—3 of FIG. 2;
FIG. 4 is an enlarged partial sectional view taken along the line 4—4 of FIG. 2;
FIG. 5 is an enlarged partial sectional view taken along the line 5—5 of FIG. 2;
FIG. 6 is a partial sectional view taken along the line 6—6 of FIG. 4;
FIG. 7 is a partial sectional view taken along the line 7—7 of FIG. 4;
FIG. 8 is a view similar to that of FIG. 7 showing an alternative arrangement for the bus engaging clips;
FIG. 9 is an enlarged partial sectional view taken along the line 9—9 of FIG. 2, showing an alternative arrangement of the retaining means of FIG. 5; and
FIG. 10 is an enlarged partial side view of a breaker with a portion of the housing broken away, showing the fixed and moving contacts.

The panelboard of FIGS. 1 and 2 includes a bus 20 fixed in a plastic molding 21 by screws (not shown) and having upstanding bus blades 22, 23. A lug 24 is mounted on the bus 20 for receiving a cable. Another bus 26 is mounted in the molding 21 by screws (not shown) and has upstanding bus blades 27, 28. A lug 29 is carried on the bus 26 for receiving a cable. The molding 21 rests on a piece of insulating paper 30 and is retained in position on a metal plate 31 by tabs 32, 33. The construction of the panelboard may be conventional.

The single breaker of the invention is made in a right-hand model and a left-hand model, which are referred to herein as an A breaker and a B breaker. In FIG. 1, an A breaker is mounted on the blade 27, a B breaker is mounted on the blade 22, and both an A breaker and a B breaker are mounted on the blade 23. A dual breaker 35 is mounted between the blades 23, 28. This dual breaker comprises two half-size breakers joined together with the bus blade contacting portions at the exterior side forming an opposite phase dual breaker. As viewed in the left side of FIG. 1, this calls for an A breaker above a B breaker. A same phase dual breaker may be formed by joining an A breaker below a B breaker with the bus contacting portions at the interior sides. These dual combinations will be described in greater detail hereinbelow.

The A and B breaker housings may be identical, with certain exceptions to be discussed below, and each housing 38 typically is formed of two molded units 39, 40 joined together by rivets or the like providing an internal space for the conventional electrical circuit breaker mechanism. A manual actuating lever 42 projects from the top of each breaker for closing and opening the electric circuit through the breaker. A recessed zone 43 is provided in the side of the breaker housing portion 39 at a corner thereof and a corresponding recessed zone 44 is provided in the housing portion 40.

A bus blade engaging conductor 50 is carried in the A housing with the blade engaging portion 51 positioned in the recessed zone 43. In the embodiment illustrated in FIGS. 4, 6 and 7, the bus engaging portion 51 is a U-shaped clip. A similar conductor is carried in the B housing, with a blade engaging U-shaped clip 52 positioned in the recessed zone 44. The bus clip 51 of the A breaker occupies only a portion of the zone 43, leaving a portion of the zone vacant for the bus clip of the adjacent B breaker. In the preferred embodiment, the conductors 51, 52 are disposed vertically, but could be disposed horizontally as illustrated in FIG. 8 if desired.

A preferred form for the conductor 50 is illustrated in FIG. 10, showing the conductor as a single unitary piece of metal with the bus engaging clip 51 formed at one end and with the fixed contact 54 of the circuit breaker carried at the other end. The conductor may ride in recesses molded in the interior of the housing units 39, 40, with the bus engaging portion 51 projecting through an opening in the side of the housing. The breaker is shown in the circuit closed condition in FIG. 10, with the moving contact 55 engaging the fixed contact 54.

Each of the blade engaging conductors 51, 52 may have a tab 58, 59, respectively, formed thereon to serve as a limit stop when a breaker is moved downward into engagement with a bus blade, as illustrated at FIG. 4.

Two breakers may be joined together as by riveting, to form the dual breaker 35 of FIGS. 1, 2 and 3. When desired, a pin 60 may be inserted through the manual actuating handles 42 of the two breakers for operating the two breakers in unison. A and B breakers may be utilized with the U-shaped blade engaging clips 51, 52 if desired. Alternatively, a single side engagement with the bus blades may be provided by forming the conductor 50 with a straight portion 61 for engaging a bus blade. A stop tab 62 may be provided if desired and the upper end of the blade engaging portion 61 may be turned inward into an opening in the housing, as indicated at 63 of FIG. 3. A spring (not shown) may be utilized for urging the portion 61 outward into engagement with a bus blade if desired.

Breakers with the single side engagement conductor portion 61 are identified herein as A' and B' breakers. As discussed above, FIGS. 1, 2 and 3 illustrate and A' and a B' breaker joined to form an opposite phase dual breaker. An A and a B breaker or an A' and a B' breaker can also be joined with the bus engaging contacts adjacent each other to form a same phase dual breaker. Also, an A breaker and a B' breaker or an A' breaker and a B breaker can be joined if desired. The bus engaging conductors of the A and A' breakers are positioned in the same portion of the recessed zone of the housing. Similarly, the bus engaging conductors of the B and B' breakers are positioned in the same portion of the recessed zone of the housing. This permits any combination of single and dual breakers to be installed side-by-side in a panelboard. Single breakers may be installed as indicated at 70 and 71 of FIG. 1. Two single breakers can be mounted on a single bus blade, as indicated at 38 of FIG. 1. Two single breakers can be mounted between a pair of bus blades, as by installing a B breaker directly below the A breaker 70 of FIG. 1 and in engagement with the bus blade 22. A single breaker may be mounted adjacent a dual breaker, as by installing a B breaker directly above the dual unit 35 on the bus blade 23 or by installing an A breaker directly below the dual unit 35 on the bus blade 28. Various other combinations will be readily apparent.

Means are provided on the panelboard for receiving and retaining a breaker at a position spaced from the bus blades. The plate 31 may be formed of sheet metal with a tab 72 formed out of a platform section 73, the upper portion of the tab being parallel to the platform and overlying an opening 74 from which the material forming the tab was removed. The tab may have ends 75, 76 for engaging two breakers.

Each breaker is provided with a groove for receiving the tab and a projection for engaging the opening below the tab and a preferred embodiment is illustrated in FIGS. 2 and 5. The housing for the A and A' breakers has a groove 80 extending part way across the breaker and closed by a wall 81. A projection 82 is formed on the bottom of the housing. The groove, wall and projection may be molded in the housing if desired. The tab 72 enters the groove and limits movement of the breaker away from the plate 31 and limits movement of the breaker in one lateral direction. The projection 82 enters the opening 74 and limits movement of the breaker in the opposite lateral direction. The housing for the B and B' breakers is constructed similarly but with the groove 80 and projection 82 on the opposite side of the housing.

An alternative construction for the housing is illustrated in FIG. 9. A groove 90 is formed across the housing and a metal strip 91 is mounted in the housing forming a wall for closing the groove. A lower portion 92 of the strip 91 projects below the housing for entering the opening 74. The metal strip 91 is designed to be oriented as illustrated in the left portion of FIG. 9 and as illustrated in the right portion of FIG. 9, permitting the A and B housings to have the same configuration, with the orientation of the metal strip being made to correspond with the position of the bus engaging conductor. The strip may be positioned in a recess 93 in the housing unit 40 and held in place by bosses 94 on the housing unit 39.

The breakers and the panelboard may incorporate interengaging elements which function to prevent the installation of breakers having certain current ratings onto certain blades of the panelboard. One such arrangement is shown in FIGS. 2 and 3 wherein a tab 95 is carried on the housing of the B' breaker. A notch 96 is formed in the bus blade 28 for receiving the tab 95. The tab 95 serves as a top and prevents mounting of the breaker onto a bus blade which does not have a mating notch.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a circuit breaker for installation in a panelboard on one side of a bus blade, the improvement comprising in combination:

a housing having a bus blade and conductor clip receiving zone at one corner of one side of the housing; and a conductor permanently mounted in said housing and having a bus clip positioned in and occupying one portion of and projecting laterally from, said zone for slidingly gripping a bus blade, with said clip leaving another unoccupied portion of said zone for a second breaker having its bus blade engaging conductor at the opposite side of its housing and in the other portion of the zone, permitting installation of both breakers at a single bus blade, said panel board including breaker retaining means spaced from the bus blade thereof comprising a horizontal plate with an opening and a tab disposed above the opening parallel to the plate, and in which said breaker includes a tab receiving horizontal slot in said housing, wall means closing one end of said slot, and a boss projecting downward from said housing for entering said opening.

2. A circuit breaker as defined in claim 1 in which said wall means and said boss comprise an angled metal strip mounted in said housing.

3. A circuit breaker as defined in claim 1 in which said wall means and said boss are formed integrally with said housing.

4. The circuit breaker as defined in claim 1 wherein said bus clip is U-shaped in configuration and wherein said conductor and bus clip are formed of a single piece of conducting metal carrying a fixed contact at the inner end thereof.

References Cited
UNITED STATES PATENTS

| 3,198,992 | 8/1965 | Norden | 317—119 |
| 3,283,110 | 11/1966 | Knecht et al. | 200—168 |
| 3,290,474 | 12/1966 | Gelzheiser | 200—168 |
| 3,309,580 | 3/1967 | Jacobs et al. | 200—168 |
| 3,309,581 | 3/1967 | Klein | 200—168 |

ROBERT K. SCHAEFER, *Primary Examiner.*

H. O. JONES, *Assistant Examiner.*